March 31, 1964 A. B. GOULSTON 3,127,271
PROCESS FOR PREPARING NON-GREASY FRIED COMESTIBLES
Filed April 17, 1962
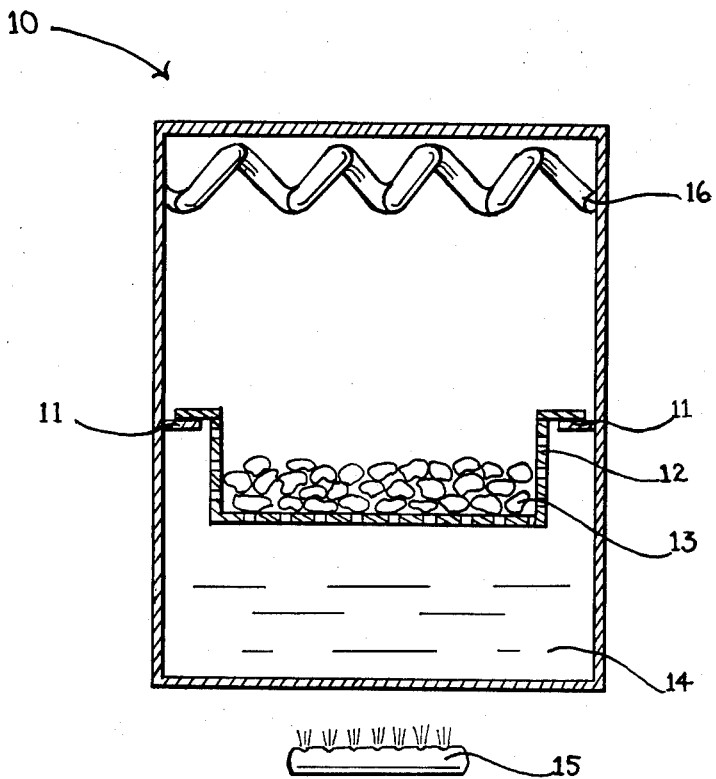
INVENTOR.
Arthur B. Goulston
BY Alvin Isaacs
Attorney

United States Patent Office 3,127,271
Patented Mar. 31, 1964

3,127,271
PROCESS FOR PREPARING NON-GREASY
FRIED COMESTIBLES
Arthur B. Goulston, Boston, Mass.
(922 Massachusetts Ave., Cambridge, Mass.)
Filed Apr. 17, 1962, Ser. No. 188,151
1 Claim. (Cl. 99—100)

This invention relates to fried comestibles and, more particularly, to fried comestibles, such as deep fat fried foodstuffs of vegetable origin, having a reduced oil content.

As is well known, fried comestibles in the form of chips, slices and the like are popular foodstuffs for snack-time, picnics, etc. Generally speaking, such comestibles are prepared by frying in a medium such as a vegetable oil heated to a suitable temperature. As examples of such foodstuffs, mention may be made of potato chips, fried onion rings, apple chips and the like.

It has been found that such comestibles frequently have a greasy or oily feel and tend to soil the hands and clothing of the consumer. Moreover, the presence of the oil cooking medium, which usually runs from 40 to 50% or more of the total weight of the foodstuff, results in an unnecessarily high caloric content.

A primary object of this invention is to prepare fried comestibles of reduced oil content.

Another object is to prepare fried comestibles of vegetable origin in the form of slices, chips, and the like, having a reduced oil content.

Still another object is to prepare fried comestibles of the foregoing character which are not greasy or oily to the touch.

Yet another object is to provide fried comestibles which do not leave a greasy film on the person of the consumer or upon objects to which they come into contact.

A still further object is to provide fried comestibles which are substantially oil or fat-free.

Other objects of the invention will in part be obvious and will in part appear hereinafter.

For a fuller understanding of the nature and objects of this invention, reference should be had to the following detailed description taken in conjunction with the accompanying drawing wherein:

The figure is a diagrammatic view of a device useful in the practice of the novel process of this invention.

Generally speaking, fried comestibles in the form of chips, slices, etc. are prepared by frying in a suitable oleaginous material after the appropriate preliminary steps, e.g. washing, peeling, slicing, cooking, etc. These steps, including the frying step, are well known in the art and comprise no part per se of the present invention. In other words, the present invention is directed to the treatment of such comestibles at some time subsequent to frying, and is adaptable to the aftertreatment of comestibles fried in oil, by whatever process they are made.

As an example of fried comestibles to which this invention is directed, mention may be made of those of vegetable origin such as potato chips. While several methods are presently used in the commercial manufacture of potato chips, the methods of preparation differ primarily only in the type or oleaginous material which is employed. A typical method for preparing potato chips involves the initial steps of peeling the potatoes, washing, slicing and then washing the slices. The washed potato slices are then fried in an edible oil, thereby cooking the potato tissue and causing puffing of the tissue which develops crispness and a tan to light brown color. In large scale operations, it is common to employ a continuous fryer which consists essentially of a trough filled with hot oil through which the raw slices are propelled while being fried. The particular oleaginous materials used in the frying will vary as to origin as well as in the proportions of hydrogenated and/or unsaturated fats contained therein.

Generally speaking, the most common frying oils are vegetable oils such as cottonseed oil, corn oil, peanut oil, soybean oil, and the like.

Other sliced fried comestibles such as apple chips, onion rings and the like, are prepared in substantially the same manner.

Other foodstuffs within the scope of this invention include those made by first forming a dough which is then cut to the desired shape and fried in a suitable oil. As an example of such foodstuffs, mention may be made, for example, of corn chips and the like.

As was mentioned previously, fried comestibles of the foregoing character possess an unnecessarily high oil or fat content. This oil, resulting from the frying step, is present on the surface of the foodstuffs as well as in the intracellular interstices. While the percentage of oil will vary according to the product, generally the amount of oil will be at least 40% by weight based upon the total weight of the foodstuff. More specifically, the oil content will generally range from 40 to 50%, although products with an oil content of 60% or more are known. These products are usually characterized by a greasy or oily feel which is unpleasant to the consumer. Moreover, there is a tendency for surface oil to adhere to the person of the consumer and surrounding objects to which they may come into contact.

According to one embodiment of the present invention, a simple and efficient process is provided for removing the surface oil from fried comestibles by solvent extraction techniques, while leaving substantially all of the remainder of the oil content, thereby obviating the aforementioned difficulties.

In another embodiment of the invention, a portion or substantially all of the oil in the intracellular interstices of the foodstuff is removed, along with the surface oil, thereby preparing a fried comestible of reduced caloric values.

The reduction in oil content is accomplished, according to the practice of this invention, by extraction with a low boiling organic solvent for the oil. Volatile organic solvents are preferred due to the ease of separating the solvent from the foodstuff, thereby obtaining a solvent-free foodstuff of reduced oil content. Moreover, it has been found that the volatile organic solvents reduce the oil content without damaging the cellular structure of the foodstuff, thereby retaining the crispness characteristic of even the thinly sliced fried comestibles such as potato chips. As examples of suitable solvents, mention may be made of alcohols such as ethyl alcohol, ketones such as acetone, low boiling petroleum fractions, pure liquid hydrocarbons such as hexane, chlorinated hydrocarbons, and various mixtures thereof. Other useful solvents will be apparent to those skilled in the art. The preferred solvent is hexane, preferably pure hexane, although excellent results have also been obtained with commercial hexane or petroleum ether, which contains about 90% n-hexane, the remainder being an isomeric mixture of various hydrocarbon containing 5–8 carbon atoms.

The solvent extraction may be performed by either batch or continuous processes. For purposes of illustration, the invention will be described in greater detail by reference to a batch process utilizing the apparatus shown in the drawing.

As illustrated in the drawing, a vessel or container 10 is provided of any suitable size, shape or material. Container 10, which may be a rectangular metal structure, is provided with means (not shown) for providing ingress and egress to the container for loading and unloading purposes. In its simplest form, such means comprises a removable cover which permits complete enclosure of container 10 during operation. Container 10 is also provided with a flange 11 at a position intermediate of the top and bottom thereof, and which is adapted to suspend a perforated holder 12 at a point above and out of contact with the extracting solvent. Holder 12 may, for example, be a wire basket of suitable shape and dimensions to hold the desired batch of fried comestible to be treated. A condensing coil 16 through which a suitable coolant such as cold tap water flows, is provided near the top of container 10.

In operation, a predetermined amount of a suitable solvent 14 is placed in the bottom of container 10, the solvent level being at some point below the bottommost part of holder 12. Holder 12 is then loaded with the fried comestible 13 and a source of heat 15 is applied beneath container 10 to elevate the temperature sufficient to boil solvent 14. The solvent vapors pass through the openings or perforations in holder 12, up through comestible 13 and are condensed at or near condenser 16. The condensed liquid solvent then drips down onto and through comestible 13, extracting the oil therefrom and eventually returning to the boiling liquid solvent body at the bottom of the container. This operation is continued for a predetermined amount of time until the desired amount of oil is removed. It will be appreciated that a suitable heating coil may be provided in the bottom of container 10 in lieu of heat source 15. Other changes in the apparatus illustrated in the drawing will be apparent to those skilled in the art.

It will be appreciated that the time of treatment will vary from comestible to comestible and will in part be dependent upon the amount of oil desired to be removed and will in part be dependent upon the rate that a given amount of surface area of the comestible being treated is contacted by the solvent. In other words, where relatively large amounts of solvent are used for extracting a given amount of oil from a given amount of comestible in holder 12, a shorter extraction time is necessary. Stated another way, the time necessary to extract amount of oil is inversely proportional to the rate at which the surface of the comestible is contacted with solvent, which in turn is related to the amount of solvent employed.

From the foregoing, it will be apparent that it is not possible to specify a specific time of treatment. The time of treatment may obviously be predetermined by the particular practitioner for each operation and will vary according to the apparatus and quantities of solvent employed and/or comestible treated.

The following examples show by way of illustration and not by way of limitation the novel process of this invention.

*Example 1*

A one ounce bag of potato chips commercially available on the market was opened and examined. The chips were noted to be greasy or oily to the touch, leaving a film of oil on the fingers. Wiping on a clean piece of facial tissue left a greasy smudge thereon. The ounce of potato chips was then suspended over 250 ml. of commercial hexane (90% n-hexane, 10% isomeric mixture of hydrocarbons having 5–8 carbon atoms) in a container similar to that illustrated in the drawing. Cold tap water was used as the coolant. Heat was applied to raise the temperature of the solvent above its boiling point (approx. 69° C.). The solvent vapors passed upwards through the mass of potato chips, condensed at the top of the apparatus and dripped back over and through the potato chips. The application of heat was continued for three minutes, after which the potato chips were removed from the apparatus and allowed to cool. The potato chips were crisp, fresh and solvent-free. They were no longer greasy to the touch, indicating that at least the surface oil had been removed. The chips tasted the same as the untreated chips. Analysis showed that 42% of the total oil content or 18% of the total weight of the chips was removed.

*Example 2*

1 ounce of potato chips was placed in the extracting apparatus as in Example 1. The extraction was carried on in the foregoing manner for 10 minutes, after which they were removed and cooled. Again, the chips were found to be crisp, fresh and solvent free. Analysis showed that substantially all of the oil, representing 43% of the total weight of the chips, was removed. The chips had a pleasant taste which was somewhat different from the untreated chips.

*Example 3*

Example 1 was repeated, using corn chips in lieu of potato chips. The solvent was pure hexane. The untreated corn chips were greasy to the feel and soiled the facial tissue, as in Example 1. The treated corn chips, which were crisp, fresh and solvent-free, no longer had a greasy feel. They tasted the same as the untreated corn chips. Analysis showed that about 40% of the total oil content or 17% of the total weight of the chips was removed.

*Example 4*

The extraction of Example 3 was repeated, except that the time of extraction was 10 minutes. The corn chips were crisp, fresh and solvent-free. They were pleasing to the taste, although the taste was somewhat different from the untreated corn chips. Analysis showed that substantially all of the oil, representing 42% of the total weight of the chips, was removed.

*Example 5*

Canned onion rings were treated with hexane in the manner described in Example 4. The rings had a pleasant taste and retained their crispness. Analysis showed that substantially all of the oil, constituting 61% of the total weight, was removed.

From the foregoing description and illustrative embodiments of the present invention, it will be seen that the process of this invention provides a simple and efficient process for reducing the oil content of fried comestibles. In one embodiment, essentially only the surface oil is removed, thereby obviating the objections relative to the surface oil soiling the hands and person of the consumer as well as surrounding objects, while not noticeably altering the taste of the comestible. In another embodiment of the invention, the fried comestible is converted into a highly palatable foodstuff tasting somewhat different from the untreated foodstuff, due to the removal of a portion or substantially all of the oil content from the intracellular interstices.

As was indicated earlier, the invention is not limited to the process described and illustrated in conjunction with the accompanying drawing. Obviously, equivalent processes may be utilized in the practice of the invention. For example, the fried comestible to be treated may be immersed in a suitable solvent for the requisite time to remove a desired amount of oil. Moreover, the novel process of this invention may be performed by continuous processing equipment. As one example of continuous processing, mention may be made of moving the comestibles through a bath of extracting solvent on an endless conveyor. In addition, the comestibles may be moved on an endless conveyor through a system such as illustrated in the drawing, whereby condensed solvent drips down over the foodstuff as it moves slowly along the conveying means. In view of the foregoing disclosure, other means for carrying out the extracting will be apparent to those skilled in the art.

It is also to be appreciated that the invention is not restricted to the particular foodstuffs whose treatment were described, for purposes of illustration, in the foregoing specific examples. Obviously other fried foodstuffs may be treated by the novel process of this invention. It is therefore to be expressly understood that the invention is applicable to any and all comestibles fried in oil or fat, regardless of the specific method by which they were prepared.

Where found desirable or expedient to do so, the fried comestible may be subjected to a gentle drying at some time subsequent to extracting, in order to make sure that all trace amounts of solvent have been removed. One particularly useful form of drying comprises air drying over a gentle stream of warm air. Other means of drying, such as vacuum drying, may obviously be employed, provided that the drying conditions are not so vigorous as to rupture or otherwise damage the delicate cellular structure of the comestible slices or chips.

It is further to be noted that, if desired, the oil may be recovered from the solvent by conventional fractional distillation or equivalent procedures and the recovered solvent may be reused to treat subsequent batches of comestibles. The oil so obtained may then be put to appropriate commercial use.

As used herein and in the appended claims, the term "fried comestible" is intended to include all comestibles prepared by cooking or frying in an edible oleaginous material, e.g. those materials commonly referred to as fats and oils. The word "oil" is employed in a generic sense to include those substances commonly referred to in the culinary art as fats.

Since various modifications may be made in this invention without departing from the spirit or scope thereof, it is expressly to be understood that the invention is limited only by the scope of the appended claim.

What is claimed is:

The process of preparing a non-greasy fried sliced comestible of reduced oil content which comprises suspending a mass of fried sliced comestible of vegetable origin selected from the group consisting of potato, onion and corn in an enclosure above and out of contact with a low boiling organic solvent for said oil; heating said solvent to effect vaporization thereof; passing said vapors through and over said mass of fried sliced comestible; condensing said vapors at a point above said mass of comestible; dripping said condensed solvent down and through said comestible to extract at least a portion of the oil content therefrom; and continuing said vaporization, condensing and extracting for a time sufficient to extract a predetermined amount of oil from said comestible and to provide a fried comestible of reduced oil content which is substantially free of surface oil.

References Cited in the file of this patent

UNITED STATES PATENTS

| | | |
|---|---|---|
| 1,100,124 | Snelling | Sept. 26, 1916 |
| 2,152,665 | Rosenthal | Apr. 4, 1939 |